United States Patent
Park et al.

(10) Patent No.: US 9,317,371 B2
(45) Date of Patent: Apr. 19, 2016

(54) SYSTEM, METHOD, AND APPARATUS FOR PERFORMING FAULT DIAGNOSIS FOR AN ELECTRONIC APPLIANCE USING SOUND DATA

(71) Applicant: Samsung Electronics Co., Ltd., Gyeonggi-do (KR)

(72) Inventors: Kyong-Ha Park, Gyeonggi-do (KR); Hyun-Su Hong, Gyeonggi-do (KR); Seung-Seop Shim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 426 days.

(21) Appl. No.: 13/837,817

(22) Filed: Mar. 15, 2013

(65) Prior Publication Data
US 2013/0268806 A1    Oct. 10, 2013

(30) Foreign Application Priority Data
Apr. 4, 2012  (KR) .................. 10-2012-0035047

(51) Int. Cl.
| | |
|---|---|
| *G06F 11/00* | (2006.01) |
| *G06F 11/14* | (2006.01) |
| *H04M 1/215* | (2006.01) |
| *H04M 1/24* | (2006.01) |
| *H04M 1/725* | (2006.01) |

(52) U.S. Cl.
CPC ......... *G06F 11/1415* (2013.01); *H04M 1/2155* (2013.01); *H04M 1/24* (2013.01); *H04M 1/7253* (2013.01)

(58) Field of Classification Search
CPC ............ G06F 11/0748; G06F 11/0793; G06F 11/3013; G06F 11/3058; G06F 11/3065
USPC ........................................................... 714/30
See application file for complete search history.

(56) References Cited

U.S. PATENT DOCUMENTS

| | | | |
|---|---|---|---|
| 8,351,852 B2 | 1/2013 | Jung et al. | |
| 2004/0064762 A1* | 4/2004 | Deshpande et al. | ............ 714/44 |
| 2005/0028034 A1* | 2/2005 | Gantman et al. | ................ 714/27 |
| 2006/0136544 A1* | 6/2006 | Atsmon et al. | ................ 709/200 |

(Continued)

FOREIGN PATENT DOCUMENTS

| | | |
|---|---|---|
| EP | 2 253 896 | 11/2010 |
| KR | 1020100048885 | 5/2010 |

(Continued)

OTHER PUBLICATIONS

European Search Report dated Nov. 16, 2015 issued in counterpart application No. 13161932.2-1972, 6 pages.

*Primary Examiner* — Bryce Bonzo
*Assistant Examiner* — Elmira Mehrmanesh
(74) *Attorney, Agent, or Firm* — The Farrell Law Firm, P.C.

(57) ABSTRACT

A fault diagnosis system, method, and apparatus are provided that diagnose a broken appliance and repair the broken appliance using voice communication. The method includes generating monitoring information, based on a current state of the appliance; generating first mix data by mixing the monitoring information and sound data; outputting the first mix data to a mobile communication terminal; receiving second mix data from the mobile communication terminal, when the monitoring information indicates that the appliance has a fault; extracting recovery data from the second mix data; and repairing the fault of the appliance using the recovery data.

16 Claims, 6 Drawing Sheets

(56) References Cited

U.S. PATENT DOCUMENTS

| | | | |
|---|---|---|---|
| 2006/0184295 A1* | 8/2006 | Hawkins et al. | 701/33 |
| 2010/0023938 A1* | 1/2010 | Lee et al. | 717/171 |
| 2010/0110837 A1 | 5/2010 | Jung et al. | |
| 2010/0262865 A1* | 10/2010 | Kim et al. | 714/37 |
| 2010/0290484 A1 | 11/2010 | Jung et al. | |
| 2011/0060553 A1* | 3/2011 | Han et al. | 702/185 |
| 2011/0142073 A1 | 6/2011 | Jung et al. | |
| 2012/0198274 A1* | 8/2012 | Cho et al. | 714/15 |
| 2012/0221885 A1* | 8/2012 | Maejima | 714/3 |

FOREIGN PATENT DOCUMENTS

| | | |
|---|---|---|
| KR | 1020100127174 | 12/2010 |
| KR | 1020110010375 | 2/2011 |
| KR | 1020110066083 | 6/2011 |
| KR | 1020110066084 | 6/2011 |
| WO | WO 2007/022788 | 3/2007 |
| WO | WO 2011/054889 | 5/2011 |

\* cited by examiner

SYSTEM, METHOD, AND APPARATUS FOR PERFORMING FAULT DIAGNOSIS FOR AN ELECTRONIC APPLIANCE USING SOUND DATA

PRIORITY

This application claims priority under 35 U.S.C. §119(a) to Korean Patent Application Serial No. 10-2012-0035047, which was filed in the Korean Intellectual Property Office on Apr. 4, 2012, the entire disclosure of which is incorporated herein by reference.

BACKGROUND OF THE INVENTION

1. Field of the Invention

The present invention relates generally to a method of diagnosing faults in electrical appliances, and more particularly, to a fault diagnosis system, method, and apparatus for diagnosing a broken appliance, and repairing the broken appliance using voice communication.

2. Description of the Related Art

More recently, electrical appliances have the ability to indicate operation faults by displaying a fault code on a display device, such as a Light Emitting Diode (LED) or a Liquid Crystal Display (LCD), equipped in or attached to the appliances or by making buzzer sounds in particular patterns.

When indicating a fault in an appliance with a display or a buzzer sound, a user still must detect for the fault code displayed on the display device or emitted by the buzzer, and then refer to the appliance's manual to look up the fault code and identify a cause of the fault. Accordingly, even with this process, the cause of the fault of the appliance may not be easily figured out by the user, and the user may unnecessarily have the appliance serviced in a service center.

SUMMARY OF THE INVENTION

Accordingly, the present invention is designed to address at least the problems and/or disadvantages described above and to provide at least the advantages described below.

An aspect of the present invention is to provide a fault diagnosis system, method, and apparatus, which diagnose a broken appliance and also repair the broken appliance using voice communication.

In accordance with an aspect of the present invention, a fault diagnosis method is provided, which includes generating monitoring information, based on a current state of the appliance; generating first mix data by mixing the monitoring information and sound data; outputting the first mix data to a mobile communication terminal; receiving second mix data from the mobile communication terminal, when the monitoring information indicates that the appliance has a fault; extracting recovery data from the second mix data; and repairing the fault of the appliance using the recovery data.

In accordance with another aspect of the present invention, a fault diagnosis method is provided, which includes receiving first mix data from a diagnosis apparatus; extracting, from the first mix data, monitoring information that indicates a current state of the appliance; determining whether a fault has occurred in the appliance, based on the monitoring information; generating second mix data by mixing sound data with recovery data for repairing the appliance, when it is determined the fault has occurred; and outputting the second mix data to the diagnosis apparatus.

In accordance with another aspect of the present invention, a firmware upgrade method of a mobile communication terminal in a fault diagnosis system is provided. The method includes receiving first mix data from a diagnosis apparatus of the appliance; extracting, from the first mix data, monitoring information that indicates a current state of the appliance; checking a version of the firmware installed in the appliance, based on the monitoring information; requesting, to a diagnosis server, for upgrade data in order to upgrade the firmware if the version of the firmware is not a newest version; generating mix data by mixing the upgrade data and sound data; and outputting the mix data to the diagnosis apparatus.

In accordance with another aspect of the present invention, a diagnosis apparatus is provided for use in a fault diagnosis system. The diagnosis apparatus includes a monitoring unit configured to detect a current state of the appliance, and generate monitoring information based on the current state of the appliance; an encoder configured to generate first mix data by mixing the monitoring information and sound data, and extract recovery data for repairing the fault in the appliance from second mix data transmitted from a mobile communication terminal, when the fault has occurred in the appliance; a speaker configured to output the first mix data to the mobile communication terminal; a microphone configured to receive the second mix data from the mobile communication terminal; and a recovery unit configured to repair the fault of the appliance using the recovery data.

In accordance with another aspect of the present invention, a mobile communication terminal is provided for use in a fault diagnosis system. The mobile communication terminal includes a microphone configured to receive first mix data from a diagnosis apparatus of the appliance; a data generator configured to extract, from the first mix data, monitoring information that indicates a current state of the appliance; a speaker configured to output, to the appliance, second mix data including recovery data for repairing the in the appliance; and a controller configured to determine whether the fault has occurred in the appliance based on the monitoring information control the data generator to generate the second mix data by mixing the recovery data and sound data, when the fault has occurred, and control the speaker to output the second mix data to the diagnosis apparatus.

BRIEF DESCRIPTION OF THE DRAWINGS

The above and other aspects, features, and advantages of certain embodiments of the present invention will become more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
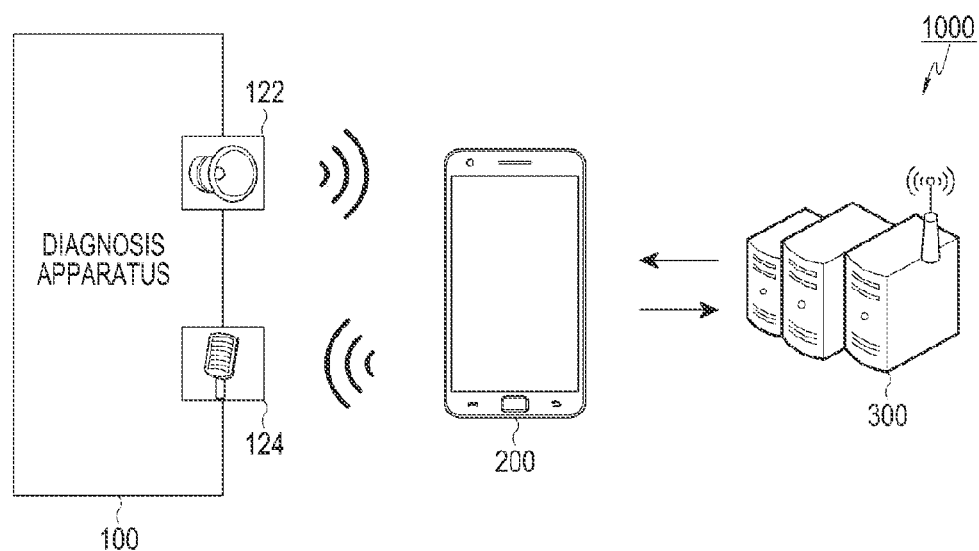
FIG. 1 illustrates a fault diagnosis system, according to an embodiment of the present invention.

FIG. 1 illustrates a fault diagnosis system, according to an embodiment of the present invention.

Referring to FIG. 1, the fault diagnosis system includes a diagnosis apparatus 100, a mobile communication terminal 200, and a diagnosis server 300.

The diagnosis apparatus 100 may be installed in connected to an appliance (not shown). The diagnosis apparatus 100 monitors the state of the appliance and, if a fault in the appliance is detected, informs the mobile communication terminal 200 of the fault occurrence. For example, the diagnosis apparatus 100 may send monitoring information, i.e., the results of monitoring the appliance, to the mobile communication terminal 200 or the diagnosis server 300 by outputting the monitoring information through a first speaker 122 in a voice communication method. The diagnosis apparatus 100 also receives data, based on which, the fault of the appliance can be recovered, or upgrade firmware installed in the appliance from the mobile communication terminal 200 or the diagnosis server 300.

Examples of appliances that could include or connect to the diagnosis apparatus 100 include refrigerators, washing machines, televisions, etc.

The mobile communication terminal 200 receives the monitoring information from the diagnosis apparatus 100 in the voice communication method. The mobile communication terminal 200 analyzes the received monitoring information and informs a user of the mobile communication terminal 200 of the fault of the appliance, when it occurs. The mobile communication terminal 200 may also indicate and inform the user of a cause of the fault of the appliance and/or a repair method for repairing the broken appliance.

In accordance with an embodiment of the present invention, the mobile communication terminal 200 generates fault data based on the monitoring information received from the diagnosis apparatus 100. When the mobile communication terminal 200 cannot figure out the cause of the fault or the repair method, e.g., the proper information is not saved therein, the mobile communication terminal 200 informs the diagnosis server 300 of the fault in the appliance by sending the fault data to the diagnosis server 300.

The diagnosis server 300 receives the fault data from the mobile communication terminal 200. The diagnosis server 300 may then send recovery data for recovering the appliance, e.g., a code list, to the mobile communication terminal 200, so that the user may recover the broken appliance by referring to the code list. The diagnosis server 300 may also send upgrade data for upgrading the firmware to the diagnosis apparatus 100 or the mobile communication terminal 200, at the request of the diagnosis apparatus 100 or the mobile communication terminal 200.

In accordance with an embodiment of the present invention, voice communications between the diagnosis apparatus 100 and the mobile communication terminal 200 may be performed as described in Korean Patent Application Nos. 10-2009-0098900, entitled "Wireless Communication Method and Apparatus Using Acoustic Signal", 10-2010-0032589, entitled "Encoder, Decoder, and Encoding and Decoding Method", 10-2010-0118065, entitled "Object Transmission Method between Devices with Multiple Radio Interfaces", and 10-2010-0118120, entitled "Method and Encoder for Encoding Information Object".

Figure 2:
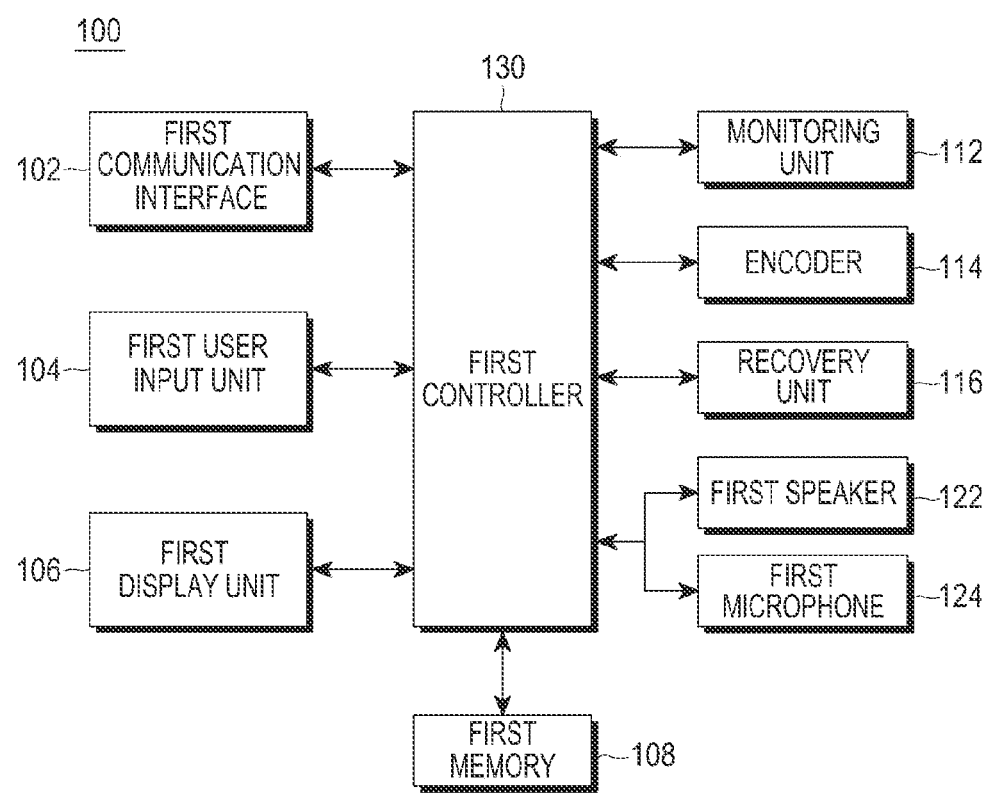
FIG. 2 is a block diagram illustrating a diagnosis apparatus in a fault diagnosis system, according to an embodiment of the present invention.

FIG. 2 is a block diagram illustrating a diagnosis apparatus according to an embodiment of the present invention.

Referring to FIG. 2, the diagnosis apparatus 100 includes a first communication interface 102, a first user input unit 104, a first display unit 106, a first memory 108, a monitoring unit 112, an encoder 114, a recovery unit 116, a first speaker 122, a first microphone 124, and a first controller 130.

The first communication interface 102 performs wired or wireless communication for the diagnosis apparatus 100. For example, the first communication interface 102 requests the mobile communication terminal 200 or the diagnosis server 300 to repair the broken appliance. The first communication interface 102 also receives recovery data for repairing the fault of the appliance, from the mobile communication terminal 200 or the diagnosis server 300.

In accordance with an embodiment of the present invention, the first communication interface 102 receives firmware installment data to install firmware in the appliance, from the mobile communication terminal 200 or the diagnosis server 300. When the appliance already has the firmware installed therein, the first communication interface 102 may receive upgrade data to upgrade the firmware, from the mobile communication terminal 200 or the diagnosis server 300.

The first user input unit 104, e.g., a keypad or touch screen input, receives user inputs from the user. In accordance with an embodiment of the present invention, the first user input unit 104 receives user inputs for diagnosing whether the appliance has a fault.

The first display unit 106, e.g., an LED or LCD, displays different data stored in and associated with the diagnosis apparatus 100. In accordance with an embodiment of the present invention, the first display unit 106 displays a current state of the appliance, based on monitoring information generated by the monitoring unit 112. Accordingly, the first display unit 106 informs the user of the fault occurrence, by displaying an appropriate indication.

The memory 108 stores different data for controlling operations of the diagnosis apparatus 100. In accordance with an embodiment of the present invention, the memory 108 stores the monitoring information generated by the monitoring unit 112 and first mix data generated by the encoder 114. The first memory 108 may also store second and third mix data received through the first communication interface 102 or the first microphone 124, or recovery data or upgrade data extracted by the encoder 114.

In accordance with an embodiment of the present invention, the first memory 108 also stores fault codes, which represent various faults that may occur in the appliance, as codes classified by types of the faults.

The monitoring unit 112 monitors the appliance, detects a current state of the appliance, and creates the monitoring information about the state of the appliance.

For example, the monitoring information may include the appliance type, a model name, a state value, a fault log that corresponds to a malfunction history of the appliance, firmware version information, etc., and may also include different data, e.g., the fault codes, to represent symptoms of faults in the appliance.

In accordance with an embodiment of the present invention, the monitoring unit 112 diagnoses the current state of the appliance at predetermined points in time and generates monitoring information representing a diagnosis result. The monitoring unit 112 may also diagnose the current state of the appliance at the request of an external device, e.g., the mobile communication terminal 200, and generate the monitoring information representing the diagnosis result.

The encoder 114 converts the monitoring information in a form for output through the first speaker 122 by mixing the monitoring information with a sound on a certain frequency band. Hereinafter, the sound to be mixed with the monitoring information is referred to as "sound data", and data that includes both the monitoring information and the sound data is referred to as "first mix data," as mentioned above. As such, the encoder 114 generates the first mix data that includes the sound data and the monitoring information.

The sound data to be mixed with the monitoring information may be on a frequency band having frequencies greater than audible frequencies, e.g., 16 KHz~22 KHz.

In accordance with an embodiment of the present invention, the encoder 114 separates recovery data for recovering the appliance from second mix data, which is captured from the first microphone 124. Herein, the second mix data refers to a mix of the sound data and the recovery data.

The recovery unit 116 recovers the broken appliance, e.g., using the recovery data stored in the first memory 108 or received through the first microphone 124. In accordance with an embodiment of the present invention, the recovery unit 116 repairs the fault in the appliance by applying an error correction code included in the recovery data to the firmware installed in the appliance. The recovery unit 116 may also perform a fault recovery process by changing an internal setting of the appliance according to a control signal contained in the recovery data.

In accordance with an embodiment of the present invention, the recovery unit 116 may upgrade the firmware installed in the appliance by changing the internal setting of the appliance according to a control signal contained in the upgrade data.

The first speaker 122 outputs the sound data. In accordance with an embodiment of the present invention, the first speaker 122 outputs the first mix data, which includes the monitoring information from the encoder 114.

The first microphone 124 captures different types of sound data. In accordance with an embodiment of the present invention, the first microphone 124 receives the second and third mix data. Herein, the second mix data refers to a mix of the sound and the recovery data, and the third mix data refers to a mix of the sound data and upgrade data for upgrading the firmware installed in the appliance.

The first controller 130 controls general operations of the diagnosis apparatus 100. In accordance with an embodiment of the present invention, the first controller 130 controls the monitoring unit 112 to diagnose the current state of the appliance, and determines whether a fault has occurred in the appliance, based on the monitoring information generated by the monitoring unit 112. When a fault has occurred in the appliance, the controller 130 controls the encoder 114 to generate the first mix data by mixing the monitoring information and the sound data.

Thereafter, the first controller 130 requests the mobile communication terminal 200 to repair the appliance by controlling the first speaker 122 to output the first mix data generated by the encoder 114.

Further, when the second mix data, which contains the recovery data, is received through the first microphone 124, the first controller 130 controls the encoder 114 to extract the recovery data from the second mix data. Using the extracted recovery data, the first controller 130 controls the recovery unit 116 to recover the appliance.

Figure 3:
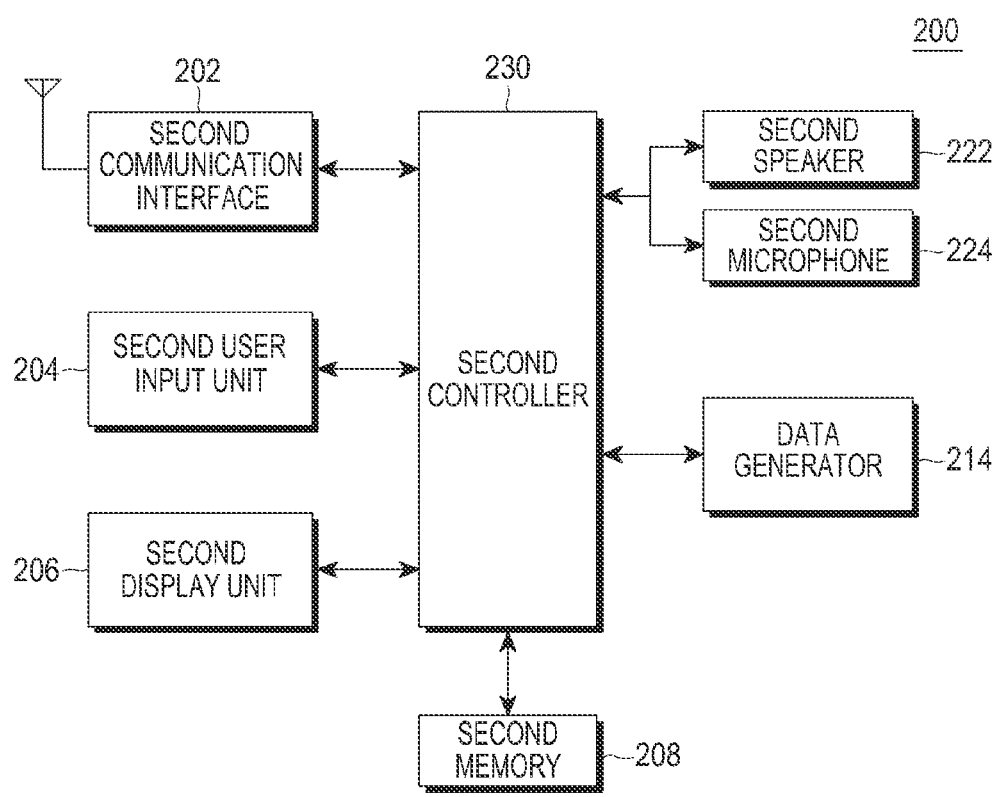
FIG. 3 is a block diagram illustrating a mobile communication terminal, according to an embodiment of the present invention.

FIG. 3 is a block diagram illustrating a mobile communication terminal according to an embodiment of the present invention.

Referring to FIG. 3, the mobile communication terminal 200 includes a second communication interface 202, a second user input unit 204, a second display unit 206, a second memory 208, a data generator 214, a second speaker 222, a second microphone 224, and a second controller 230.

The second communication interface 202 performs wireless communication for the mobile communication terminal 200. In accordance with an embodiment of the present invention, the second communication interface 202 transmits fault data to the diagnosis server 300 and receives recovery data from the diagnosis server 300. The second communication interface 202 may also receive upgrade data from the diagnosis server 300.

The second user input unit 204, e.g., a keypad or a touch screen input, receives user inputs from the user of the mobile communication terminal 200. In accordance with an embodiment of the present invention, the second user input unit 204 receives a user input requesting a diagnosis as to whether the appliance has a fault. The second user input unit 204 also receives a user input to request to upgrade the firmware installed in the appliance.

The second display unit 206, e.g., an LCD or LED, displays different types of data stored in and associated with the mobile communication terminal 200. In accordance with an embodiment of the present invention, the second display unit 206 may display a current state of the appliance based on monitoring information received from the diagnosis apparatus 100. The second display unit 206 may also inform the user of the fault in the appliance by displaying an appropriate indication.

The second memory 208 stores different data for controlling operations of the mobile communication terminal 200. In accordance with an embodiment of the present invention, the second memory 208 stores upgrade data received through the second communication interface 202 and recovery data to recover the broken appliance. Further, the second memory 208 stores a plurality of fault codes and recovery data that corresponds to the plurality of fault codes. For example, the fault codes and the recovery data may be stored in a format as shown in Table 1.

TABLE 1

| Fault Codes | Recovery Data |
| --- | --- |
| CODE001122NY | RE001122NY |
| CODE112233XS | RE112233XS |
| CODE223344QA | RE223344QA |
| CODE334455JK | RE334455JK |
| CODE445566UX | RE445566UX |
| CODE556677BE | RE556677BE |
| CODE667788VX | RE667788VX |

The data generator 214 generates the second mix data by mixing the recovery data with a sound on a particular frequency band, and generates the third mix data by mixing the upgrade data with the sound on the particular frequency band.

The second speaker 222 outputs the sound data, i.e., the second mix data or the third mix data generated by the data generator 214.

The second microphone 224 captures different types of sound data, including the first mix data output by the diagnosis apparatus 100.

The second controller 230 controls general operations of the mobile communication terminal 200. In accordance with an embodiment of the present invention, the second controller 230 determines whether a fault has occurred in the appliance, based on the monitoring information in the first mix data output from the diagnosis apparatus 100. When a fault has occurred, the second controller 230 controls the second display unit 206 to display a corresponding indication.

The second controller 230 also analyzes the monitoring information and determines whether the fault in the appliance is repairable by the user. If the fault is repairable by the user, the second controller 230 controls the second display unit 206 to display a repair method, which may be pre-stored in the second memory 208.

For example, when turning off the broken appliance and then turning it back on is all that required to repair the appliance, the second controller 230 indicates the repair method to the user, e.g., by controlling the display 206 to display a pop-up window that requests the user to turn off the appliance and then turn it on again.

In accordance with an embodiment of the present invention, the second controller 230 determines whether the fault that has occurred in the appliance is repairable, based on at least a piece of the recovery data stored in the second memory 208. If the fault is repairable based on the recovery data stored in the second memory 208, i.e., if the appliance may be recovered using the recovery data, the second controller 230 transmits the recovery data to the diagnosis apparatus 100.

The second controller 230 retrieves, from the second memory 208, recovery data that corresponds to a fault code included in the monitoring information. For example, referring to Table 1, when the fault code included in the monitoring information is 'CODE556677BE', recovery data 'RE556677BE' corresponds to the fault code. Thus, the second controller 230 determines that the fault that has occurred in the appliance is repairable by the mobile communication terminal 200.

In accordance with an embodiment of the present invention, the controller 230 determines the fault code that corresponds to a fault occurred in the appliance, based on the monitoring information. Using the determined fault code, the second controller 230 retrieves recovery data that corresponds to the fault code from the second memory 208 and determines whether the fault is repairable by the mobile communication terminal 200.

The second controller 230 controls the data generator 218 to generate the second mix data by mixing the recovery data with the sound data on a particular frequency band. Further, the second controller 230 may transmit the recovery data to the diagnosis apparatus 100 through the second communication interface 202.

When a fault occurs that is not repairable with the recovery data stored in the second memory 208, i.e., if the fault is not repairable by the mobile communication terminal 200, the second controller 230 controls the second communication interface 202 to request the diagnosis server 300 to send the recovery data. For example, the second controller 230 may request the recovery data from the diagnosis server 300 by controlling the second communication interface 202 to send the monitoring information or the fault code to the diagnosis server 300.

Figure 4:
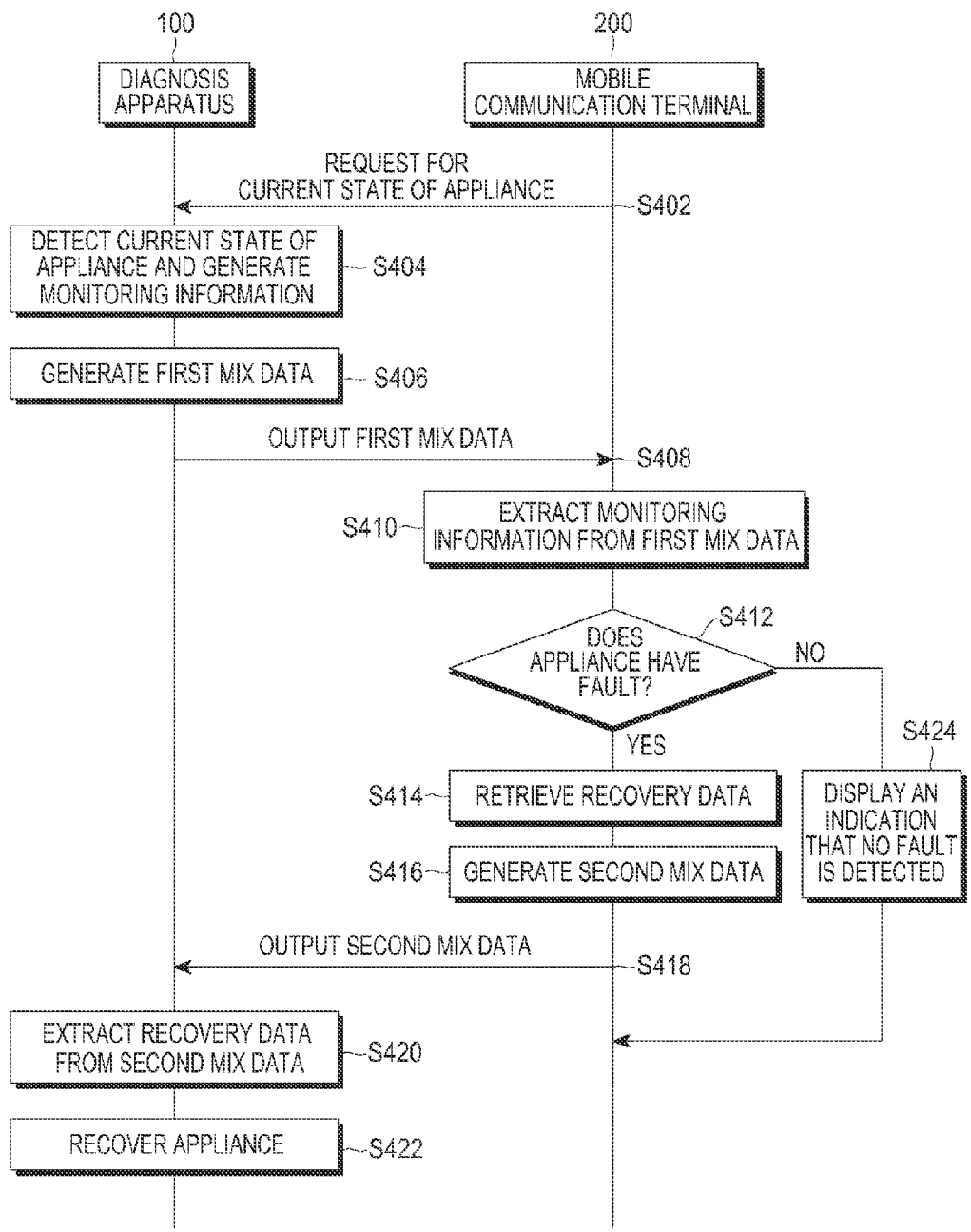
FIG. 4 is signal flow diagram illustrating a fault diagnosis method, according to an embodiment of the present invention.

FIG. 4 is a signal flow diagram illustrating a fault diagnosis method according to an embodiment of the present invention. In FIG. 4, a fault occurred in an appliance is repairable with at least a piece of recovery data stored in the second memory 208.

Referring to FIG. 4, in step S402, the mobile communication terminal 200 requests the diagnosis apparatus 100 to diagnose the current state of the appliance. For example, prior to step S402, the mobile communication terminal 200 may receive a user input from the user through the second user input unit 204, requesting the state of the appliance.

In step S404, the diagnosis apparatus 100 detects the current state of the appliance and generates the monitoring information. In step S406, using the generated monitoring information, the diagnosis apparatus 100 generates the first mix data by mixing the monitoring information with the sound data on a particular frequency band.

In step S408, the diagnosis apparatus 100 outputs the first mix data through the first speaker 122. The mobile communication terminal 200 receives the first mix data through the second microphone 224 in step S408.

In step S410, the mobile communication terminal 200 extracts the monitoring information from the first mix data. In step S412, the mobile communication terminal 200 determines whether a fault has occurred in the appliance, based on the monitoring information.

When a fault has occurred in the appliance in step 412, the second controller 230 of the mobile communication terminal 200 retrieves recovery data stored in the second memory 208 for repairing the fault diagnosed by the diagnosis apparatus 100 in step S414. In step S416, the mobile communication terminal 200 generates the second mix data using the retrieved recovery data.

In step S418, the mobile communication terminal 200 outputs the second mix data through the second speaker 212.

In step S418, the diagnosis apparatus 100 receives the second mix data through the first microphone 124, and in step S420, the diagnosis apparatus 100 extracts the recovery data from the second mix data. In step S422, the diagnosis apparatus 100 recovers the appliance using the recovery data.

However, when no fault has occurred in the appliance in step S412, the mobile communication terminal 200 displays an indication that no fault is detected in step S424. In an embodiment, the mobile communication terminal 200 may not perform any separate operation.

Figure 5:
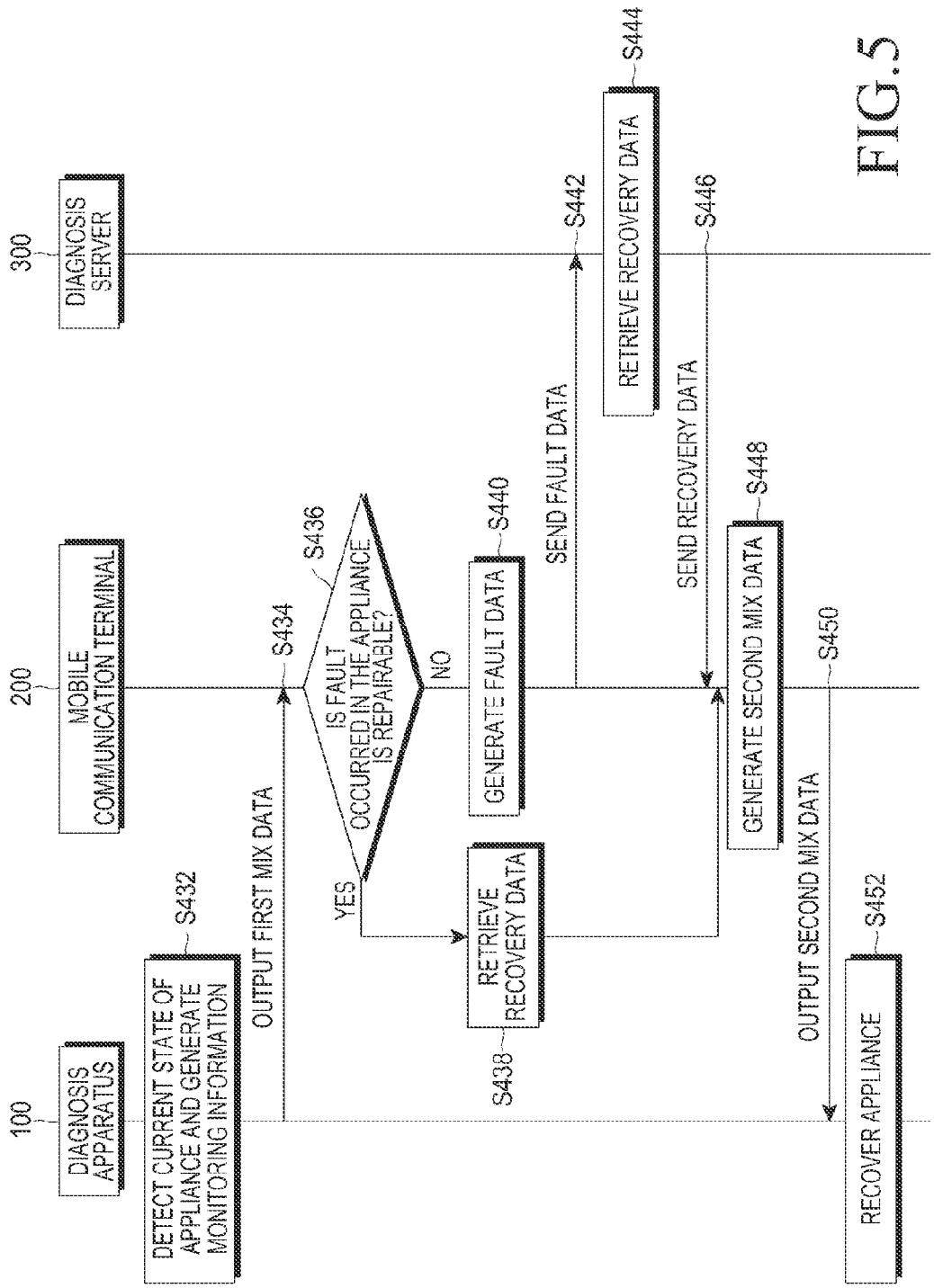
FIG. 5 is a signal flow diagram illustrating a fault diagnosis method, according to an embodiment of the present invention.

FIG. 5 is a signal flow diagram illustrating a fault diagnosis method according to an embodiment of the present invention. In FIG. 5, a fault that occurs in an appliance is not repairable with recovery data stored in the mobile communication terminal 200.

Referring to FIG. 5, the diagnosis apparatus 100 detects a current state of the appliance and generates monitoring information in step S432. Thereafter, the diagnosis apparatus 100 generates first mix data by mixing the monitoring information with the sound data on a particular frequency band. In step S434, the diagnosis apparatus 100 outputs the first mix data through the first speaker 122.

The mobile communication terminal 200 receives the first mix data through the second microphone 224 and then the data generator 216 of the mobile communication terminal 200 extracts the monitoring information from the first mix data. In step S436, the second controller 230 of the mobile communication terminal 200 determines whether the fault that has occurred in the appliance is repairable, based on the monitoring information. For example, if there is recovery data stored in the second memory 208 that can be used to repair the fault in the appliance, the second controller 230 deems the fault repairable.

In accordance with an embodiment of the present invention, the second controller 230 extracts a fault code from the monitoring information, and determines that the fault in the appliance is repairable if recovery data corresponding to the fault code is stored in the second memory 208.

When the fault in the appliance is repairable by the mobile communication terminal 200, the mobile communication terminal 200 retrieves proper recovery data from the memory in step S438, and generates the second mix data with the retrieved recovery data in step S448. The second mix data is output through the speaker in step S450, and received by the diagnosis apparatus 100 through the first microphone 124.

Upon receiving the second mix data, the diagnosis apparatus 100 extracts the recovery data from the second mix data and recovers the appliance with the recovery data in step S452.

However, when the fault that has occurred in the appliance is not repairable by the mobile communication terminal 200, the mobile communication terminal 200 generates fault data regarding the fault in the appliance in step S440. In step S442, the mobile communication terminal 200 transmits the fault data to the diagnosis server 300 through the second communication interface 202. In accordance with an embodiment of the present invention, the fault data includes a fault code that corresponds to the fault in the appliance.

Upon reception of the fault data, in step S444, the diagnosis server 300 retrieves recovery data pre-stored in the diagnosis server 300, based on the fault data. In accordance with an embodiment of the present invention, the diagnosis server 300 retrieves the recovery data that corresponds to the fault code contained in the fault data.

In step S446, the diagnosis server 300 transmits the recovery data to the mobile communication terminal 200. The mobile communication terminal 200 generates the second mix data using the recovery data received from the diagnosis server 300 in step S448, and outputs the second mix data through the second speaker 222 in step S450. The diagnosis apparatus 100 receives the second mix data through the first microphone 124, extracts the recovery data from the second mix data, and recovers the appliance using the recovery data in step S452.

Figure 6:
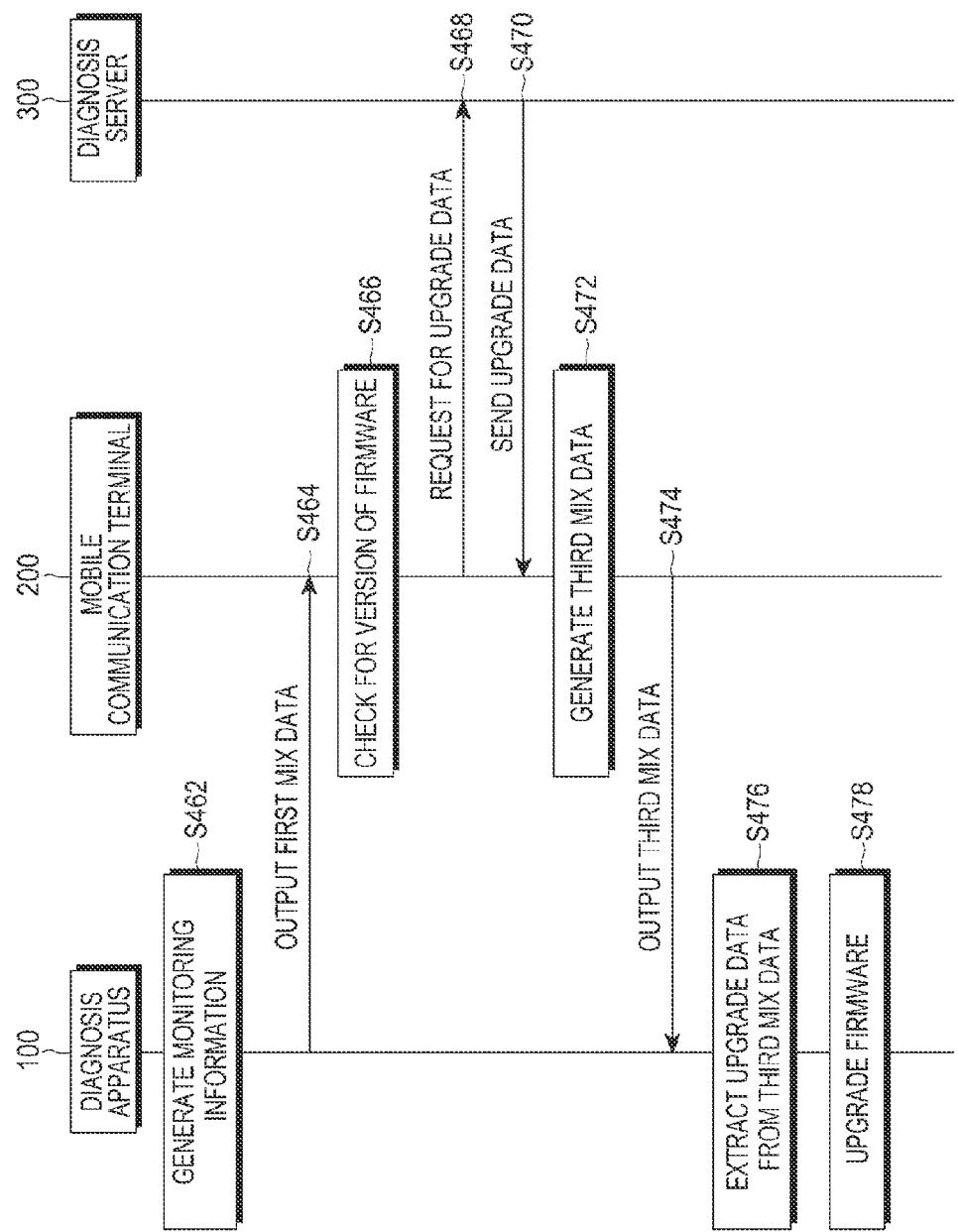
FIG. 6 signal flow diagram illustrating a method for upgrading firmware installed in a diagnosis apparatus, according to an embodiment of the present invention.

FIG. 6 is a signal flow diagram illustrating a method of upgrading firmware installed in a diagnosis apparatus according to an embodiment of the present invention. In FIG. 6, a version of firmware installed in an appliance is an older version than that stored in the diagnosis server 300.

Referring to FIG. 6, the diagnosis apparatus 100 generates the monitoring information in step S462. For example, the monitoring unit 112 of the diagnosis apparatus 100 may include version information of the firmware installed in the appliance.

The encoder 118 of the diagnosis apparatus 100 generates first mix data by mixing the monitoring information with sound data pre-stored in the first memory 108. In step S464, the diagnosis apparatus 100 outputs the first mix data through the first speaker 122.

The mobile communication terminal 200 receives the first mix data through the second microphone 224. The data generator 214 of the mobile communication terminal 200 extracts the monitoring information from the first mix data, and in step S466, the second controller 230 checks a version of the firmware installed in the appliance, based on the monitoring information.

If the version of the firmware is older than that stored in the diagnosis server 300, the mobile communication terminal 200 requests upgrade data from the diagnosis server 300 in step S468.

In step S470, the diagnosis server 300 sends the upgrade data to the mobile communication terminal 200, and in step S472, the data generator 216 of the mobile communication terminal 200 generates the third mix data by mixing the upgrade data with the sound data.

In step S474, the second speaker 222 of the mobile communication terminal 200 outputs the third mix data to the diagnosis apparatus 100. The diagnosis apparatus 100 receives the third mix data through the first microphone 124. The encoder 116 of the diagnosis apparatus 100 extracts the upgrade data from the third mix data in step S476, and the first controller 130 of the diagnosis apparatus 100 upgrades the firmware using the upgrade data in step S478.

It is understood that the fault diagnosis method or the firmware upgrade method in the above-described embodiments of the present invention may also be implemented using a combination of hardware and software. The software may be stored as program instructions or computer readable codes executable on the processor on a computer-readable medium. Examples of the computer readable recording medium include magnetic storage media (e.g., Read Only Memory (ROM), floppy disks, hard disks, etc.), and optical recording media (e.g., Compact Disc (CD)-ROMs, or Digital Versatile Discs (DVDs)). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing a program or programs having instructions that implement the embodiments of the present invention. The program may be electronically carried on any medium, such as communication signals transferred via wired or wireless connection, and the present invention suitably includes its equivalent.

The appliance or the mobile communication terminal 200 may receive and store the program from a program provider wire/wirelessly connected thereto. The program provider may include a memory for storing programs having instructions to perform the above-described embodiments of the present invention, information for the above-described embodiments of the present invention, etc., a communication unit for wire/wirelessly communicating with the mobile communication terminal 200, and a controller for sending the program to the mobile communication terminal 200.

The above-described embodiments of the present invention provide a fault diagnosis system, method, and apparatus that diagnose a broken appliance and also repair the broken appliance using voice communication.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of diagnosing a fault in an appliance by a diagnosis apparatus in a fault diagnosis system, the method comprising:
   generating and displaying monitoring information, based on a current state of the appliance;
   generating first mix data by mixing the monitoring information and sound data;
   outputting the first mix data to a mobile communication terminal;
   receiving second mix data including recovery data from the mobile communication terminal, when the monitoring information indicates that the appliance has a fault, and if the fault is not repairable via the mobile communication terminal, receiving second mix data including recovery data from a diagnosis server;
   extracting the recovery data from the second mix data; and
   repairing the fault of the appliance using the recovery data.

2. The method of claim 1, further comprising receiving a request for detecting the current state of the appliance from the mobile communication terminal.

3. The method of claim 1, wherein the first mix data is output through a speaker included in the appliance, and wherein the second mix data is received through a microphone included in the appliance.

4. A method of diagnosing a fault in an appliance by a mobile terminal in a fault diagnosis system, the method comprising:
- receiving first mix data from a diagnosis apparatus, which displays a current state of the appliance;
- extracting, from the first mix data, monitoring information that indicates the current state of the appliance;
- determining whether a fault has occurred in the appliance, based on the monitoring information;
- generating second mix data, including recovery data, by mixing sound data with the recovery data for repairing the appliance, when it is determined the fault has occurred, and if the fault is not repairable via the mobile communication terminal, receiving second mix data including recovery data from a diagnosis server; and
- outputting the second mix data to the diagnosis apparatus.

5. The method of claim 4, further comprising requesting, to the diagnosis apparatus, for detecting the current state of the appliance.

6. The method of claim 4, wherein generating the second mix data comprises:
- determining whether the fault that has occurred in the appliance is repairable; and
- generating the second mix data by mixing the sound data with the recovery data.

7. The method of claim 4, wherein the diagnosis apparatus is included in the appliance.

8. A method of upgrading firmware of an appliance by a mobile communication terminal in a fault diagnosis system, the method comprising:
- receiving first mix data from a diagnosis apparatus of the appliance;
- extracting, from the first mix data, monitoring information that indicates a current state of the appliance and triggers the mobile communication terminal to display a no fault indication at the mobile communication terminal when the appliance has no fault;
- checking a version of the firmware installed in the appliance, based on the monitoring information;
- requesting, to a diagnosis server, for upgrade data in order to upgrade the firmware if the version of the firmware is not a newest version;
- generating mix data by mixing the upgrade data and sound data; and
- outputting the mix data to the diagnosis apparatus.

9. The method of claim 8, wherein the diagnosis apparatus is included in the appliance.

10. A diagnosis apparatus for detecting a fault in an appliance in a fault diagnosis system, the diagnosis apparatus comprising:
- a monitoring unit configured to detect a current state of the appliance, and generate monitoring and displaying information based on the current state of the appliance;
- an encoder configured to generate first mix data by mixing the monitoring information and sound data, and extract recovery data for repairing the fault in the appliance from second mix data, including recovery data, transmitted from a mobile communication terminal, when the fault has occurred in the appliance, and if the fault is not repairable via the mobile communication terminal, receiving second mix data including recovery data from a diagnosis server;
- a speaker configured to output the first mix data to the mobile communication terminal;
- a microphone configured to receive the second mix data from the mobile communication terminal; and a
- recovery unit configured to repair the fault of the appliance using the recovery data.

11. A mobile communication terminal for detecting a fault in an appliance in a fault diagnosis system, the mobile communication terminal comprising:
- a microphone configured to receive first mix data from a diagnosis apparatus, which displays a current state of the appliance;
- a data generator configured to extract, from the first mix data, monitoring information that indicates the current state of the appliance;
- a speaker configured to output, to the appliance, second mix data including recovery data for repairing the in the appliance; and
- a controller configured to determine whether the fault has occurred in the appliance based on the monitoring information control the data generator to generate the second mix data by mixing the recovery data and sound data, when the fault has occurred, and if the fault is not repairable via the mobile communication terminal, receiving second mix data including recovery data from a diagnosis server, and control the speaker to output the second mix data to the diagnosis apparatus.

12. The mobile communication terminal of claim 11, further comprising a communication interface configured to performs wireless communication.

13. The mobile communication terminal of claim 12, wherein the controller checks a version of firmware installed in the appliance, based on the monitoring information, and controls the communication interface to request for upgrade data in order to upgrade the firmware, when the version of the firmware is not a newest version.

14. The mobile communication terminal of claim 13, wherein the data generator generates third mix data by mixing the upgrade data with the sound data, and wherein the speaker outputs the third mix data to the diagnosis apparatus.

15. The mobile communication terminal of claim 11, wherein the data generator generates the second mix data by mixing the recovery data transmitted from the diagnosis server with the sound data.

16. The mobile communication terminal of claim 11, wherein the diagnosis apparatus is included in the appliance.

* * * * *